United States Patent
Aissi et al.

(10) Patent No.: US 9,282,455 B2
(45) Date of Patent: Mar. 8, 2016

(54) SYSTEM AND METHOD FOR USER CERTIFICATE INITIATION, DISTRIBUTION, AND PROVISIONING IN CONVERGED WLAN-WWAN INTERWORKING NETWORKS

(75) Inventors: Selim Aissi, Beaverton, OR (US); Mrudula Yelamanchi, Portland, OR (US); Abhay Dharmadhikari, Beaverton, OR (US); Benjamin Matasar, Portland, OR (US); Jane Dashevsky, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/956,765

(22) Filed: Oct. 1, 2004

(65) Prior Publication Data
US 2006/0075242 A1 Apr. 6, 2006

(51) Int. Cl.
*H04M 1/66* (2006.01)
*H04M 1/68* (2006.01)
(Continued)

(52) U.S. Cl.
CPC ........... *H04W 12/06* (2013.01); *H04L 63/0823* (2013.01); *H04W 12/04* (2013.01); *H04W 12/08* (2013.01); *H04W 48/16* (2013.01)

(58) Field of Classification Search
CPC ..... H04W 12/06; H04W 12/04; H04W 48/16; H04W 76/021; H04W 84/12; H04W 12/08; H04L 63/0823
USPC ............... 455/410, 411, 418, 419, 41.1–41.3, 455/11.1, 556.1, 556.2, 558, 552.1, 553.1; 380/247; 713/155, 156, 168–172, 180, 713/175; 726/10; 370/247–250, 270
See application file for complete search history.

(56) References Cited

U.S. PATENT DOCUMENTS 5,737,419 A * 4/1998 Ganesan ........................ 713/169
6,886,095 B1 * 4/2005 Hind et al. ..................... 713/168
(Continued)

FOREIGN PATENT DOCUMENTS

EP 1 370 023 10/2003
JP 2002-56140 2/2002
(Continued)

OTHER PUBLICATIONS

"3rd Generation Partnership Project; Technical Specification Group Service and System Aspects; 3G Security; Wireless Local Area Network (WLAN) Interworking Security; (Release 6)," 3GPP TS 33.234 V0.4.0 (Mar. 2003), pp. 1-40.
(Continued)

*Primary Examiner* — Olumide T Ajibade Akonai
(74) *Attorney, Agent, or Firm* — Trop, Pruner & Hu, P.C.

(57) ABSTRACT

A system and method for user certificate initiation, distribution, and provisioning in converged WLAN-WWAN interworking networks. A computing device operable in a wireless local area network sends a public key to a mobile device operable in a wireless cellular wide area network. The mobile device performs a bootstrapping procedure with a cellular operator in the wireless cellular wide area network to obtain a user certificate based on the public key. The mobile device sends the user certificate to the computing device for installation on the computing device. The user certificate may be used for digital signature, verification, and encryption purposes. The user certificate is also used in both the wireless local area network and the wireless wide area network for authenticating a subscriber when accessing services from both networks.

17 Claims, 2 Drawing Sheets

(51) Int. Cl.
  *H04M 3/16* (2006.01)
  *H04W 12/06* (2009.01)
  *H04L 29/06* (2006.01)
  *H04W 12/04* (2009.01)
  *H04W 12/08* (2009.01)
  *H04W 48/16* (2009.01)

(56) References Cited

U.S. PATENT DOCUMENTS

| | | | |
|---|---|---|---|
| 7,024,226 B2* | 4/2006 | Sandberg et al. | 455/558 |
| 7,263,608 B2* | 8/2007 | Challener et al. | 713/156 |
| 7,787,626 B2* | 8/2010 | Brown et al. | 380/273 |
| 2002/0012433 A1 | 1/2002 | Haverinen et al. | |
| 2003/0126085 A1* | 7/2003 | Srinivasan | 705/51 |
| 2004/0030887 A1* | 2/2004 | Harrisville-Wolff et al. | 713/155 |
| 2004/0171369 A1* | 9/2004 | Little et al. | 455/410 |
| 2005/0083846 A1* | 4/2005 | Bahl | 370/236 |
| 2005/0086467 A1* | 4/2005 | Asokan et al. | 713/155 |
| 2005/0138355 A1* | 6/2005 | Chen et al. | 713/155 |
| 2005/0154909 A1* | 7/2005 | Zhang et al. | 713/200 |
| 2005/0216740 A1* | 9/2005 | Laitinen et al. | 713/175 |
| 2006/0046692 A1* | 3/2006 | Jelinek et al. | 455/411 |
| 2006/0059332 A1* | 3/2006 | Adams et al. | 713/156 |
| 2006/0059341 A1* | 3/2006 | Dharmadhikari et al. | 713/168 |
| 2006/0120531 A1* | 6/2006 | Semple et al. | 380/270 |
| 2006/0174116 A1* | 8/2006 | Balfanz et al. | 713/168 |
| 2008/0126797 A1* | 5/2008 | Kim et al. | 713/155 |

FOREIGN PATENT DOCUMENTS

| | | |
|---|---|---|
| JP | 2002-288376 | 10/2002 |
| JP | 2003-510713 | 3/2003 |
| JP | 2003-209546 | 7/2003 |
| JP | 2004-274359 | 9/2004 |
| JP | 2004527017 | 9/2004 |
| WO | WO 01/23980 | 5/2001 |
| WO | WO 03/071734 | 8/2003 |
| WO | WO 03/084265 A1 | 10/2003 |
| WO | WO 03/091858 | 11/2003 |
| WO | WO 03/091858 A2 | 11/2003 |

OTHER PUBLICATIONS

International Search Report and Written Opinion from PCT/US2005/035412, mailed Feb. 6, 2006, 15 pages.
Chinese Intellectual Property Office, First Office Action in a related patent application with English language translation.
UK Intellectual Property Office, Examination Report Under Seciton 18(4) dated Oct. 7, 2008.
Chinese Intellectual Property Office, Office Action dated Jan. 9, 2009 in a related patent application with English language translation.
English language translation of a Notice of Preliminary Rejection issued on Jul. 14, 2008 by the Korean Intellectual Property Office in a related patent application, pp. 1-3.
Korean Intellectual Property Office, Notice of Preliminary Rejection dated Jan. 30, 2009 in related patent application.
Japanese Patent Office, Final Notice of Reasons for Rejection mailed Feb. 22, 2011 in Japanese application No. 2007-534842.
Katsumi Adachi, "Realization of Ubiquitous Network Society by Wireless Means," Toshiba Corporation, Apr. 1, 2003, vol. 58, No. 4, pp. 2-6.
Warwick Ford, et al., "Digital Signature and Cryptography—Security System and Legal Infrastructure for Secure Electronic Commerce," Dec. 24, 1997, First Edition, p. 166.
German Patent Office, Office Action mailed Mar. 26, 2012 in German application No. 11 2005 002 362.1-3.
Japanese Intellectual Property Office "Notice of Reasons for Rejection" in application 2007-534842 Mailed on Aug. 17, 2010.

* cited by examiner

SYSTEM AND METHOD FOR USER CERTIFICATE INITIATION, DISTRIBUTION, AND PROVISIONING IN CONVERGED WLAN-WWAN INTERWORKING NETWORKS

BACKGROUND OF THE INVENTION

1. Field of the Invention

Embodiments of the present invention are generally related to the field of WLAN-WWAN (wireless local area network-wireless wide area network) interworking. More particularly, embodiments of the present invention are related to the initiation, distribution, and provisioning of user certificates in converged WLAN-WWAN interworking.

2. Description

Currently, there are various types of wireless networks that are useful for different types of environments. For example, there are wireless wide-area networks (WWANs) and wireless local-area networks (WLANs). WWAN networks may be used for cellular communications, such as, but not limited to, cellular phones and personal digital assistants (PDAs). Example WWAN networks include, but are not limited to, mobile networks such as Global System for Mobile Communications (GSM), Third Generation (3G) of Mobile Communications Technology, and Code Division Multiple Access (CDMA). WLAN networks may be used on computers, such as, but not limited to, laptops, notebooks, workstations, etc. Example WLAN networks include, but are not limited to, 802.11, 802.16, etc.

There are also wireless local links, such as, for example, Bluetooth and Infrared Data Association (IrDA). Such wireless local links allow mobile devices (also referred to as mobile terminals) to communicate with personal computers (PCs) such as laptops, notebooks, workstations, etc.

Today, wireless operators, such as, for example, T-Mobile, AT&T Wireless, and Verizon Wireless, which have historically provided cellular type services via WWAN networks, are now beginning to offer WLAN type services as well. By offering both WWAN and WLAN services, these operators are striving to achieve what is called converged network operations, where WWAN-WLAN services are converged. In converged networks, subscribers may want to use the same authentication data or same credentials for all services offered (e.g., WWAN and WLAN services). Unfortunately, today's certificate provisioning technologies are either WWAN specific (e.g., GSM 03.48, WPKI (Wireless Application Protocol Public Key Infrastructure)) or WLAN specific (e.g., PKI (Public Key Infrastructure)). At present, there is no integrated and seamless way to generate and provision a common user-certificate in a combined and converged WWAN-WLAN network, so that the certificate may be used for both WLAN and WWAN authentication and access.

Thus, what is needed is a system and method that allows certificate provisioning for users in a seamless manner so that the users can authenticate themselves and access services on each type of network in a combined and converged interworking network using a single credential.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Figure 1:
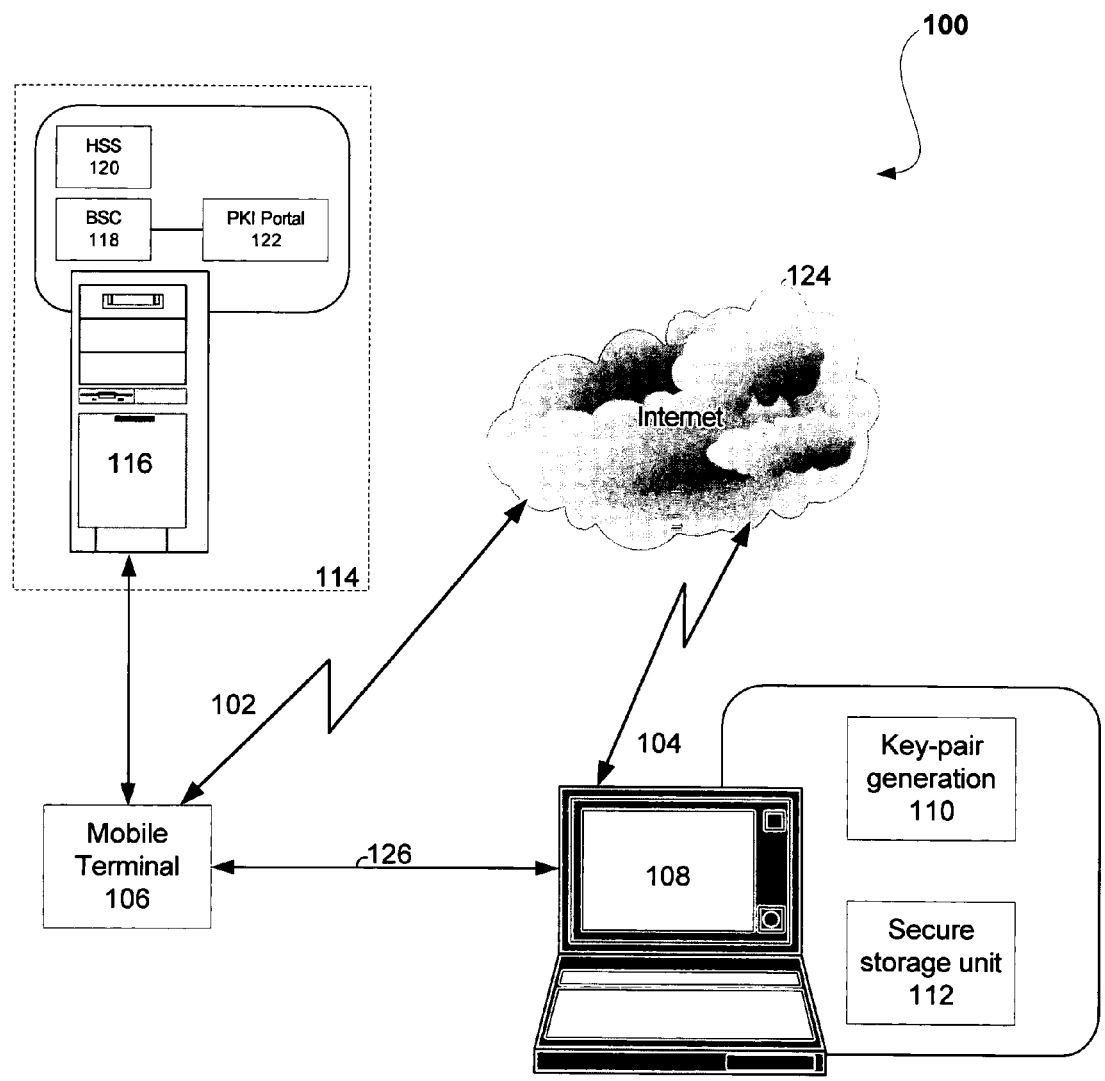
FIG. 1 is a diagram illustrating an exemplary system for providing user certificate initiation, distribution, and provisioning in a converged WWAN-WLAN interworking network according to an embodiment of the present invention.

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearance of the phrases "in one embodiment" and "in an embodiment" appearing in various places throughout the specification are not necessarily all referring to the same embodiment.

Embodiments of the present invention are directed to a system and method for providing user certificate initiation, distribution, and provisioning in a converged WWAN-WLAN interworking network. This is accomplished by transferring a public key generated on a personal computing device to a mobile device, and then having the mobile device send the public key to a cellular network operator infrastructure for certification. A certificate incorporating the public key is then distributed to the mobile device and the personal computing device to enable a subscriber to be authenticated when using the WWAN-WLAN services on the converged network via the mobile device or the personal computing device. Applications may also use the certificate and key pair for digital signature, verification, and encryption purposes. The certificate may also enable mutual authentication.

Thus, embodiments of the present invention allow the computing device in the converged WWAN-WLAN interworking network to play a major role in provisioning the user certificate. Having a seamless certificate generation and provisioning method extends the scope of wireless subscriber certificates outside the WWAN network into the WLAN network to SIM (Subscriber-Identity-Module), USIM (UMTS (Universal Mobile Telephone System) SIM), or RUIM (Removable User Identity Module) computing devices as well as computing devices without SIMs, USIMs, or RUIMs. Support of non-cellular devices, such as laptops, notebooks, and other computing devices is essential for WLAN access where the computing device is a more convenient platform than a cellular device (e.g., more memory, larger screen).

Although embodiments of the present invention are described for use in a converged WWAN-WLAN interworking network, the invention is not limited to converged WWAN-WLAN interworking networks. One skilled in the relevant art(s) would know that embodiments of the invention may be equally applicable to other types of networks that may be converged today or in the future to form an interworking network.

FIG. 1 is a diagram illustrating an exemplary system 100 for providing user certificate initiation, distribution, and provisioning in a converged WWAN-WLAN interworking network according to an embodiment of the present invention. System 100 comprises a WWAN network 102 and a WLAN network 104. Both WWAN network 102 and WLAN network 104 may be owned and operated by a single service provider, such as a telecommunications operator capable of providing WWAN services and WLAN services. WWAN network 102 comprises a mobile terminal 106 having WWAN access/support. WLAN network 104 comprises a personal computer 108 having WLAN access/support. Both WWAN network 102 and WLAN network 104 allow mobile terminal 106 and personal computer 108, respectively, access to the Internet 124, or other networks, such as, for example, corporate networks. In embodiments of the present invention, mobile terminal 106 and personal computer 108 are operated by the same subscriber.

Although embodiments of the present invention are described using one mobile terminal and one personal computer, one skilled in the relevant art(s) would know that a subscriber having multiple mobile terminals and/or multiple personal computers may have the user certificate distributed to each mobile terminal and/or personal computer to enable use of a single user certificate for each device used by the subscriber.

A backend infrastructure 114 for the telecommunications operator is also shown in FIG. 1. Backend infrastructure 114 comprises, inter alia, a home location register (HLR) 116. HLR 116 comprises a main database of permanent subscriber information for both networks 102 and 104. HLR 116 contains pertinent user information, such as name, address, account status, preferences, etc. HLR 116 further comprises a base station controller (BSC) 118, a home subscriber server (HSS) 120, and a public key infrastructure (PKI) portal 122.

BSC 118 provides control functions and physical links between a mobile services switching center (MSC) (not shown) and a base transceiver station (i.e., radio equipment) (also not shown).

HSS 120 stores new parameters in the subscriber profile related to the use of a bootstrapping function. Bootstrapping is a well known process used to securely manage information to and from remote wireless devices, such as, but not limited to, GSM 03.48. In embodiments of the present invention, bootstrapping may be used to push information, such as, for example, the public key, to HSS 120 of backend infrastructure 114 for insertion into the certificate. Bootstrapping may also be used to distribute the certificate back to mobile terminal 106 and thereafter, personal computer 108. As previously indicated, in embodiments where a subscriber has multiple mobile terminals and/or personal computers, bootstrapping may also be used to distribute the user certificate to each mobile terminal, and thereafter, each personal computer.

PKI portal 122 comprises a collection of certificates. All of the certificates generated by telecommunications operator 114 are stored in PKI portal 122.

Personal computer 108 comprises, inter alia, a key-pair generator 110 and a secure storage unit 112. Personal computer 108 may be a laptop, a notebook, a workstation, or any other computing device capable of having WLAN support.

Key pair generator 110 enables personal computer 108 to play a major role in the provisioning of the user certificate. Key-pair generator 110 provides a secure and reliable way to generate a key pair. The key-pair includes both a public key and a private key. The key-pair may be generated using hardware, software, or via a smart card.

For example, the key-pair may be generated using a trusted platform module (TPM) implemented on personal computer 108. The TPM provides hardware-based protection for the encryption and digital signature keys that secure the confidentiality of user data. The TPM protects encryption keys and platform authentication information from software-based attacks by securing them in hardware.

As previously indicated, the key-pair may also be generated using software, such as, for example CAPI (Cryptographic Application Program Interface), manufactured by Microsoft Corporation. In other embodiments, a smart card may also be used to generate the key-pair in a well-known manner. As will be discussed later, the public key portion of the key-pair is be used to generate the certificate in the converged network.

Secure storage unit 112 provides a secure means for storing the private key of the key-pair. Secure storage unit 112 also stores the certificate that is generated by backend infrastructure 114.

System 100 also provides a wired or wireless local link 126 between mobile terminal 104 and personal computer 108 for passing data between mobile terminal 104 and personal computer 108. Local link 126 may include wireless technologies such as, for example, Bluetooth, IrDA, or other types of wireless technologies that may be used to enable mobile terminals to communicate with personal computers. Local link 126 may also include wired technologies such as, for example, a Universal Serial Bus (USB) cable, a serial cable, an Ethernet cable, or any other cable that may be used to enable communications between a mobile terminal and a personal computer.

Embodiments of the present invention allow operators and service providers the ability to offer subscribers improved ease of use, unified billing, and use of existing network infrastructures in a converged interworking network. By provisioning a single certificate for accessing WWAN and WLAN services, mobile terminals and personal computers may have a unified network authentication method. Also, mobile personal computers, such as, for example, laptops and notebooks, may be provided with the ability to roam, which has traditionally only been used by wireless phones.

Figure 2:
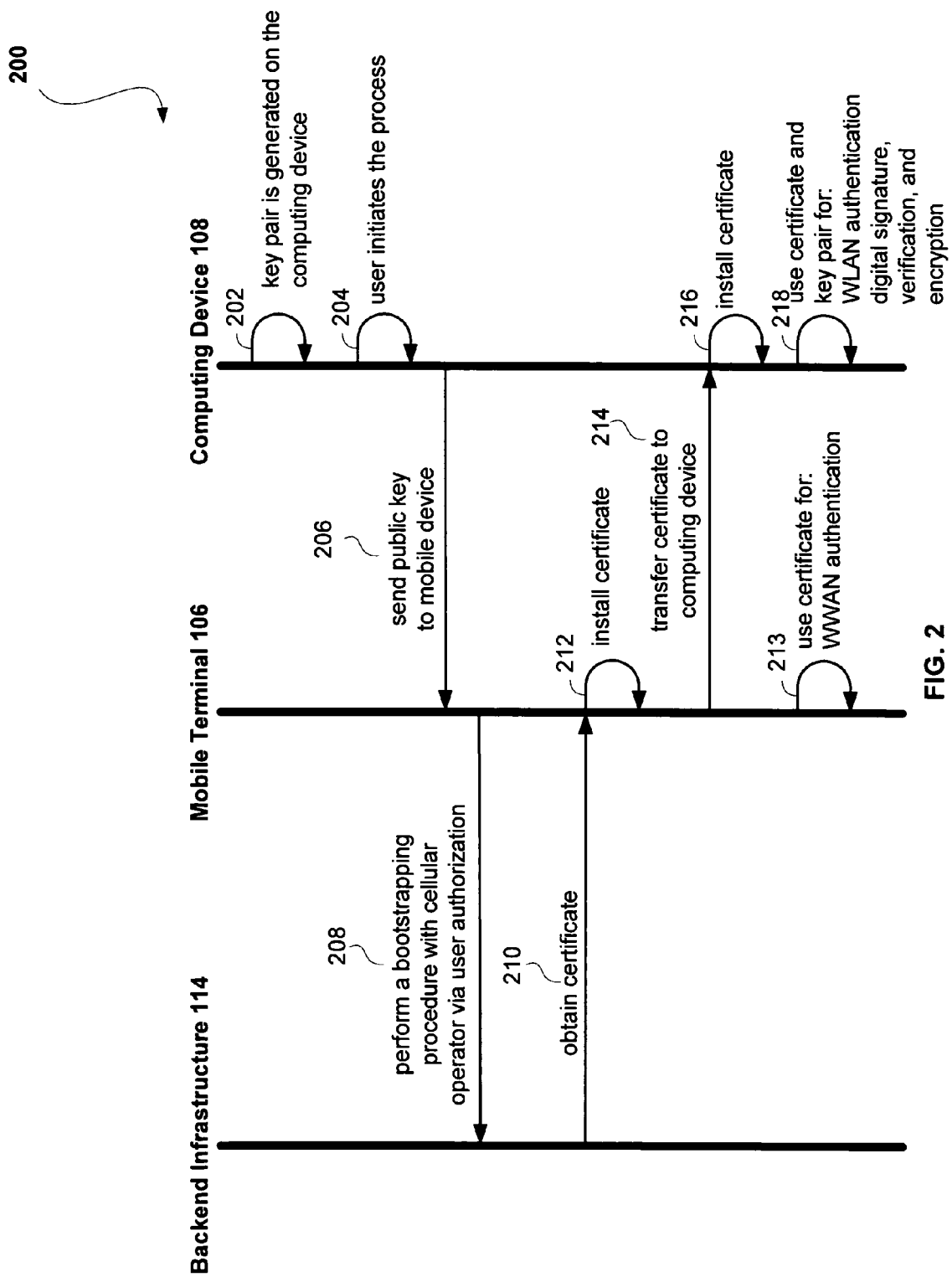
FIG. 2 is an action flow diagram illustrating an exemplary method for providing user certificate initiation, distribution, and provisioning in a converged WWAN-WLAN interworking network according to an embodiment of the present invention.

To access services on either network (WWAN network 102 or WLAN network 104), subscribers must be able to authenticate themselves as an authorized user of the network. FIG. 2 is an action flow diagram describing an exemplary method 200 for providing user certificate initiation, distribution, and provisioning in a converged WWAN-WLAN interworking network according to an embodiment of the present invention. The invention is not limited to the embodiment described herein with respect to action flow diagram 200. Rather, it will be apparent to persons skilled in the relevant art(s) after reading the teachings provided herein that other functional action flow diagrams are within the scope of the invention. The process is described from the perspective of personal computer 108, mobile terminal 106, and cellular network backend infrastructure 114. The process begins at 202, where a secure and reliable key pair is generated on personal computer 108. The key pair may be generated via hardware, software, or a smart card as indicated above. The private key portion of the key pair is stored in secure storage unit 112.

In 204, a user (i.e., subscriber) or an application may initiate the process of generating and distributing a user certificate. At 206, a public key from the key pair is transferred from computing device 108 to mobile terminal 106 over location limited channel 126. As indicated above, location limited channel 126 may be a wired or wireless location limited channel that enables mobile terminal 106 to communicate with computing device 108.

At 208, mobile terminal 106 performs a bootstrapping procedure with the cellular operator by pushing the public key to backend infrastructure 114. The user must authorize the bootstrap operation. In one embodiment, the bootstrap operation is authorized by requiring the user to enter a personal identification number (PIN) obtained from the cellular operator into mobile terminal 106.

The bootstrapping procedure enables backend infrastructure 114 to generate a user certificate for the public key and distribute the user certificate to mobile terminal 106 in 210. The user certificate may be stored on mobile terminal 106 in 212. In one embodiment, the user certificate may be installed on mobile terminal 106 via a SIM card. The storage of the user certificate on mobile terminal 106 enables WWAN authentication and access to services offered by WWAN network 102 (in 213). In one embodiment, a certificate for the cellular operator may also be obtained and installed on the SIM card.

In 214, the user certificate (and the cellular operator certificate, if obtained) is transferred to computing device 108 via a wired or wireless channel 126. In an embodiment where a subscriber has multiple mobile terminals 106 and/or multiple computing devices 108, the user certificate may be distributed to the remaining mobile terminals 106 and computing devices 108 as well.

In 216, the user certificate is installed on computing device 108. In one embodiment, the user certificate may be installed by storing it in the trusted platform module (i.e., secure storage unit 112). In another embodiment, the user certificate may be installed via a software-based store. In yet another embodiment, the user certificate may be installed on the user's smart card. Yet in another embodiment, the user certificate may be stored on a SIM. If the cellular operator certificate is also obtained, it may also be installed on the computing device, smart card, or SIM.

In 218, applications may use the certificate and key pair for digital signature, verification, and/or encryption purposes. In an embodiment where the cellular operator certificate was also obtained and installed, applications may also use it when verifying digital signatures. The cellular operator certificate will also enable mutual authentication, which is well known to those skilled in the relevant art(s).

In one embodiment, a user may use the certificate to sign documents, emails, etc., to verify emails and other types of documents, to encrypt emails and other types of documents, to perform e-commerce, etc. The secure and reliable key pair may also be used to secure WLAN operations.

Although embodiments of the present invention have been described for generating and distributing a user certificate, the invention is not limited to a single user obtaining a single certificate. In embodiments of the invention, more than one user certificate may be generated and distributed to a single user as well.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A method comprising:
generating a security key pair in a personal computer, wherein the security key pair comprises a public key and a private key, the public key stored in a secure storage of the personal computer;
sending the public key from the personal computer to a mobile terminal and sending the public key from the mobile terminal to a cellular operator;
receiving a first instance of a user certificate, from the cellular operator, at the mobile terminal;
sending a second instance of the user certificate from the mobile terminal to the personal computer;

sending a plurality of instances of the user certificate respectively from the mobile terminal to a plurality of personal computers;

utilizing the mobile terminal on a wireless wide-area network (WWAN) based on the first instance while simultaneously utilizing the personal computer on a wireless local-area network (WLAN) based on the second instance and simultaneously utilizing the plurality of personal computers on the WLAN based on the plurality of instances of the user certificate;

wherein the mobile terminal includes the first instance of the user certificate while simultaneously the personal computer includes a second instance of the user certificate and the plurality of personal computers include the plurality of instances of the user certificate;

wherein the user certificate was generated by the cellular operator based on the public key sent from the mobile terminal.

2. A method according to claim 1, further comprising:
prompting a user at the mobile terminal for a personal identification number (PIN) for authentication with the cellular operator; and
receiving the PIN from the user at the mobile terminal;
wherein storing the first instance in the mobile terminal is performed after receiving the PIN from the user at the mobile terminal.

3. A method according to claim 1, further comprising storing the second instance in a trusted platform module (TPM) in the personal computer.

4. A method according to claim 1, further comprising:
prompting a user at the mobile terminal for a personal identification number (PIN) for authentication with the cellular operator; and
receiving the PIN from the user at the mobile terminal;
utilizing the first instance to authenticate the mobile terminal on the WWAN; and
utilizing the first instance to authenticate the user as a subscriber to the WWAN.

5. A method according to claim 1, further comprising:
prompting a user at the mobile terminal for a personal identification number (PIN) for authentication with the cellular operator; and
receiving the PIN from the user at the mobile terminal;
utilizing the first instance to authenticate the mobile terminal on the WWAN;
utilizing the first instance to authenticate the user as a subscriber to the WWAN;
utilizing the second instance to authenticate the personal computer on the WLAN; and
utilizing the second instance to authenticate the user as a subscriber to the WLAN.

6. A method according to claim 1, further comprising utilizing the second instance for digital signature purposes.

7. A method according to claim 1, wherein the mobile terminal comprises a mobile device capable of cellular telephone communications.

8. A method according to claim 1, wherein the user certificate includes the public key.

9. A method according to claim 1, wherein neither of the personal computer and the mobile terminal have been authenticated before sending the public key from the mobile terminal to a cellular operator.

10. At least one non-transitory storage medium having instructions stored thereon for causing a system to perform operations comprising:

generating a security key pair in a first computing node, the security key pair comprising a public key and a private key;
sending the public key from the first computing node to a mobile second computing node;
sending the public key from the second computing node to a cellular operator network;
receiving a second instance of a user certificate, from the cellular operator network, at the second computing node;
sending a first instance of the user certificate from the second computing node to the first computing node;
sending a plurality of instances of the user certificate respectively from the second computing node to a plurality of computing nodes;
simultaneously utilizing (a) the second computing node on a wireless wide-area network (WWAN) based on the second instance, (b) the first computing node on a wireless local-area network (WLAN) based on the first instance, and (c) the plurality of computing nodes on the WLAN based on the plurality of instances;
wherein simultaneously the first computing node includes the first instance, the second computing node includes the second instance, and the plurality of computing nodes includes the plurality of instances;
wherein the second instance was generated by the cellular operator based on the public key sent.

11. The at least one non-transitory storage medium of claim 10, the operations comprising:
prompting a user at the second computing node for a personal identification number (PIN) for authentication with the cellular operator; and
receiving the PIN from the user at the second computing node;
wherein storing the second instance in the second computing node is performed after receiving the PIN from the user at the second computing node.

12. The at least one non-transitory storage medium of claim 10, the operations comprising storing the first instance in a trusted platform module (TPM) in the first computing node.

13. The at least one non-transitory storage medium of claim 10, the operations comprising:
prompting a user at the second computing node for a personal identification number (PIN) for authentication with the cellular operator; and
receiving the PIN from the user at the second computing node;
utilizing the second instance to authenticate the second computing node on the WWAN;
utilizing the second instance to authenticate the user as a subscriber to the WWAN;
utilizing the first instance to authenticate the first computing node on the WLAN; and
utilizing the first instance to authenticate the user as a subscriber to the WLAN.

14. At least one non-transitory storage medium having instructions stored thereon for causing a system to perform operations comprising:
sending a public key from a first computing node (node) to a cellular operator network;
receiving an instance of a user certificate, from the cellular operator network, at the first node;
sending a plurality of instances of the user certificate from the first node to a plurality of nodes;
simultaneously utilizing (a)(i) the first node on a wireless wide-area network (WWAN) based on the instance, and (a)(ii) a first plurality of the plurality of nodes on a wireless local-area network (WLAN) based on the plurality of instances;

wherein simultaneously the first node includes the instance while the plurality of nodes include the plurality of instances.

15. The at least one non-transitory storage medium of claim 14, the operations comprising receiving the public key at the first node from one of the plurality of nodes.

16. The at least one non-transitory storage medium of claim 15, wherein the instance was generated by the cellular operator based on the public key sent.

17. The at least one non-transitory storage medium of claim 14, the operations comprising simultaneously utilizing (b)(i) the first node on the WWAN based on the instance, (b)(ii) the first plurality of the plurality of nodes on the WLAN based on the plurality of instances, and (b)(iii) a second plurality of the plurality of nodes on the WWAN based on the plurality of instances.

\* \* \* \* \*